United States Patent
Spira et al.

[15] 3,684,959
[45] Aug. 15, 1972

[54] MOVING COIL ELECTRICAL MEASURING INSTRUMENTS

[72] Inventors: John Ralph Spira; Anthony John Newman, both of Witham, England

[73] Assignee: Crompton Parkinson Limited, London, England

[22] Filed: Nov. 6, 1970

[21] Appl. No.: 87,376

[30] Foreign Application Priority Data

Nov. 11, 1969 Great Britain..........55,122/69

[52] U.S. Cl..................324/151 R, 29/595, 335/222
[51] Int. Cl............G01r 1/16, G01r 3/00, H01f 7/08
[58] Field of Search .324/151 R, 151 A; 29/595, 607; 335/222, 281

[56] References Cited

UNITED STATES PATENTS 2,607,812  8/1952  Federer..................324/151 R

*Primary Examiner*—Alfred E. Smith
*Attorney*—Kemon, Palmer & Estabrook

[57] ABSTRACT

A moving coil electrical measuring instrument of the kind having a magnetic structure defining a tunnel within which the moving coil rotates, opposite polefaces of the tunnel being formed respectively on the inner surface of a surrounding ring of magnetic material and on the surface of a separate polepiece in contact with one polar surface of a permanent magnet of which the other polar surface is in contact with the surrounding ring has the separate polepiece supported by members of non-metallic elastic material, preferably nylon, which extend across the gaps between the outer edges of the two polefaces and are maintained under compression as the result of mechanical deformation of the magnetic material adjacent one polar surface of the permanent magnet. By forming the surrounding ring and the separate polepiece stacks of laminations riveted together, the mechanical deformation can be carried out by a staking operation which crushes the laminations together.

8 Claims, 3 Drawing Figures

PATENTED AUG 15 1972

3,684,959

Inventors
JOHN R. SPIRA
ANTHONY J. NEWMAN
By
Kemon, Palmer & Estabrook
Attorneys

MOVING COIL ELECTRICAL MEASURING INSTRUMENTS

This invention relates to moving coil electrical measuring instruments of the kind in which the magnetic structure defines a tunnel within which the coil rotates, the opposite polefaces of this tunnel being formed respectively on the inner surface of a surrounding ring of magnetic material and on the surface of a separate polepiece. This separate polepiece is in contact with one polar surface of the permanent magnet of which the other polar surface is in contact with the ring so that the ring itself has one polarity and the separate polepiece has the opposite polarity. In order to give a rigid assembly the separate polepiece needs to be supported from the ring and since these two components are of opposite magnetic polarities the support must be such as to avoid by-passing the working flux across the tunnel.

According to the present invention the separate polepiece is supported by members of non-metallic elastic material extending across the gaps between the outer edges of the two polefaces and maintained under compression as the result of mechanical deformation of the magnetic material adjacent one polar surface of the permanent magnet. The dimensions of the components prior to assembly are such that they can be slid directly into position to give a dimension between the polefaces on opposite sides of the tunnel which is greater than the required diameter of the tunnel. Once assembled the magnetic material adjacent the magnet is mechanically deformed in such a way as to force the separate pole piece towards the opposite poleface to a position corresponding to the correct circular cross section of the tunnel thereby compressing the elastic material and rendering the assembly as a whole rigid. This simplifies the assembly and enables it to be constructed within close tolerances, and the non-metallic supports do not by-pass the working flux.

Preferably the surrounding ring and the separate polepiece are formed of stacks of laminations riveted together to form rigid components. Such a construction permits ready deformation of the material in the final step of the assembly since the laminations may be staked, i.e., crushed together by means of an appropriately shaped blade-like tool. Preferably this action is carried out near the junction between the magnet and the outer ring, the staking of the inner surface of the outer ring serving to force both the magnet and the separate polepiece inwardly to bring the tunnel to its correct final dimension and also to compress the supporting members. As an alternative however, it is also possible to stake the laminations of the separate polepiece where they abut against the magnet. This has a similar effect except that the magnet itself is not displaced and it is only the separate polepiece which is moved slightly to complete the assembly.

When the assembly is complete the elastic supporting members are maintained under permanent compression and it is this force which holds the components of the assembly together. It is important therefore that the correct degree of compression should be ensured in that it should be sufficient to produce a large enough compressive force to hold the components firmly in position but should not be so great as to rupture the elastic material. The nature of the elastic material is also important in this connection in that it should not take up too great a permanent set which would reduce the compressive force with time. It is also important that its elastic properties should not deteriorate with time, thus releasing the compressive force. Various grades of nylon are suitable for this purpose particularly the glass-filled grade MARANYL A190.

A construction in accordance with the invention will now be described by way of example with reference to the accompanying drawings in which.

Figure 2:
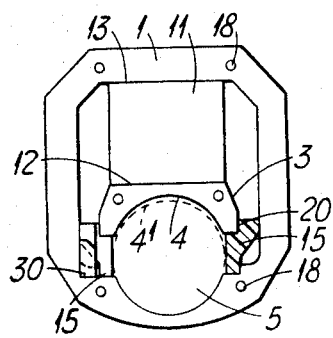
FIG. 2 is a diagrammatic plan view of the main components of the structure after initial assembly; and, FIG. 3 is a view similar to that of FIG. 2 showing the position of the components after deformation of the magnetic material and after fitting a flux concentrator and moving coil.

The magnetic structure shown in the drawings is of a known type in that it comprises an outer ring 1 of magnetic material shaped to form a poleface 2 and a separate polepiece 3 shaped to form a poleface 4, the polefaces 2 and 4 between them defining opposite sides of a tunnel 5 best seen in FIG. 2, in which the moving coil 6 operates. The separate polepiece 3 is in contact with one face of a permanent magnet 11 of which the opposite face is in contact with the inner surface of the ring 1. The magnet is magnetized so that the surfaces 12 and 13 in contact respectively with the polepiece 3 and the ring 1 are the polar surface 5 so that the polepiece 3 and hence the poleface 4 has one polarity and the ring 1 and hence the poleface 2 has the opposite polarity.

The structure so far described is all known in itself and presents the problem of supporting the polepiece 3 from the ring 1 without by-passing the magnetic flux across the tunnel 5. For this purpose in accordance with the invention supports 15 of non-metallic elastic material are fitted in the positions best seen in FIGS. 2 and 3. During the initial assembly the dimensions of the magnet 11, the polepiece 3 and the supports 15 are such in relation to the internal dimension of the ring 1 that these components can be freely slid into position as shown in FIG. 2. At this stage the distance between the polefaces 2 and 4 is slightly greater than the required diameter of the tunnel 5, the dotted arc 4' indicating the required position.

Figure 1:
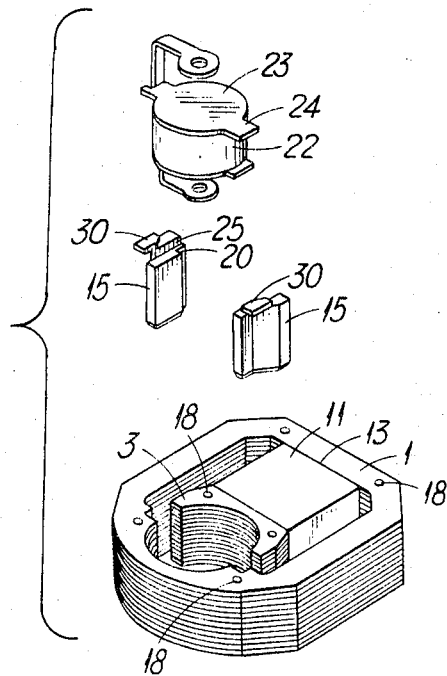
FIG. 1 is an exploded perspective view of the components of the magnetic structure of a moving coil electrical measuring instrument.
Figure 3:
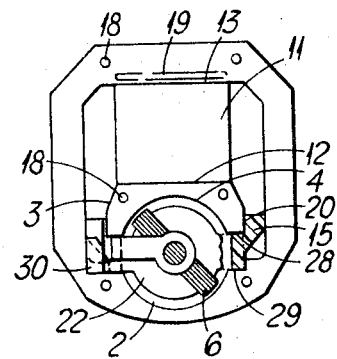

In order to make the assembly as a whole rigid and at the same time to bring the poleface 4 into its required position the material of the ring 1 adjacent the polar surface 13 is mechanically deformed. As illustrated in FIG. 1 the ring 1 and the polepiece 3 are built up from stacks of laminations held together by rivets 18 and the mechanical deformation is carried out by a staking operation which crushes the laminations together along a narrow area 19 seen in FIG. 3. This operation moves the magnet 11 and the polepiece 3 towards the poleface 2 thus moving the poleface 4 to its correct ultimate position as seen in FIG. 3 and at the same time compressing the supports 15 so as to give a rigid assembly with the internal components firmly held in position.

The polepiece 13 also requires to be correctly located in a transverse direction and the supports 15 are accordingly formed with steps 20 into which the limbs of the polepiece 3 fit. Appropriate shaping of the supports 15 also serves to locate a flux concentrator 22 shown in FIG. 3 which is fitted in position after the initial assembly. As best seen from FIG. 1 this component is fitted at each end with a plate 23 formed with transverse projections 24 and these are received between shoulders 25 on the supports 15. The projections 24 are also located between surfaces 28 on the polepiece 3 and 29 on the outer ring 1 so that in this way the flux concentrator 22 is accurately centered within the tunnel 5. To ensure that the supports 15 are themselves accurately located in a direction parallel with the axis of the coil 6 they are formed with small projecting portions 30 (best seen in FIG. 1) which engage the surface of the ring 1 as seen in FIGS. 2 and 3. Consequently during assembly the supports 15 are slid into position until the projections 30 engage the surface of the ring 1 when no further movement is possible.

We claim:

1. In a moving coil electrical measuring instrument having a magnetic structure including a surrounding ring of magnetic material, a permanent magnet having one polar surface in contact with said ring and a separate polepiece in contact with the other polar surface of said magnet, said structure defining a tunnel for the rotation of a moving coil, opposite pole faces of said tunnel being formed respectively on the inner surface of said ring and said separate polepiece, the improvement which comprises supporting said polepiece by members of non-metallic elastic material extending across gaps between the outer edges of said two polefaces and maintained under compression as a result of mechanical deformation of the magnetic material adjacent one polar surface of said permanent magnet.

2. An instrument according to claim 1, in which said ring of magnetic material and said separate polepiece are each formed of a stack of laminations riveted together.

3. An instrument according to claim 2, in which the material of said ring adjacent the polar surface of said permanent magnet has been deformed by staking.

4. An instrument according to claim 1, in which said non-metallic elastic material is nylon.

5. An instrument according to claim 1, in which said members of non-metallic elastic material are each formed with a step for the location of end portions of said separate polepiece.

6. An instrument according to claim 5, and including a flux concentrator fitting within said moving coil, said flux concentrator being formed with transverse projections whereby it is located in one direction between said ring of magnetic material and said separate polepiece and in a direction at right angles to said one direction between shoulders on the surfaces of said members of non-metallic elastic material.

7. An instrument according to claim 6, in which said members of non-metallic elastic material are formed with projections overlying said ring of magnetic material whereby said members are located in a direction parallel with the axis of said moving coil.

8. A method of assembling the magnetic structure of a moving coil electrical measuring instrument, said magnetic structure including a surrounding ring of magnetic material, a permanent magnet having one polar surface in contact with said ring and a separate polepiece in contact with the other polar surface of said magnet, said structure defining a tunnel for the rotation of a moving coil, opposite polefaces of said tunnel being formed respectively on the inner surface of said ring and said separate polepiece, in which method said surrounding ring, said permanent magnet and said separate polepiece are fitted loosely into position together with members of non-metallic elastic material for supporting said separate polepiece, after which the magnetic material adjacent one polar surface of said permanent magnet is deformed by staking so as to compress said members of non-metallic elastic material whereby to yield a rigid assembly.

* * * * *